(12) United States Patent
Storrie et al.

(10) Patent No.: US 8,436,260 B2
(45) Date of Patent: May 7, 2013

(54) COIL RETENTION ASSEMBLY FOR ELECTRONIC ASSEMBLY

(75) Inventors: William Storrie, Motherwell (GB); Brian George Babin, Bristol, IN (US); Eric E. Fromer, Elkhart, IN (US)

(73) Assignee: CTS Corporation, Elkhart, IN (US)

( * ) Notice: Subject to any disclaimer, the term of this patent is extended or adjusted under 35 U.S.C. 154(b) by 475 days.

(21) Appl. No.: 12/460,711

(22) Filed: Jul. 23, 2009

(65) Prior Publication Data

US 2010/0025103 A1 Feb. 4, 2010

Related U.S. Application Data

(60) Provisional application No. 61/137,296, filed on Jul. 29, 2008.

(51) Int. Cl.
*H05K 7/14* (2006.01)

(52) U.S. Cl.
USPC ............... 174/545; 336/117; 336/208

(58) Field of Classification Search ............... 174/545; 336/177, 208
See application file for complete search history.

(56) References Cited

U.S. PATENT DOCUMENTS

| 4,766,277 | A | * | 8/1988 | Bigelow, Jr. ............. 200/293 |
| 5,497,880 | A | | 3/1996 | Dieffenbach |
| 5,631,556 | A | | 5/1997 | Shibata |
| 6,952,972 | B2 | * | 10/2005 | Schulze et al. ........... 73/862.041 |
| 7,622,909 | B2 | * | 11/2009 | Teppan ..................... 324/126 |
| 7,936,164 | B2 | * | 5/2011 | Doogue et al. ........... 324/117 H |
| 2002/0014888 | A1 | | 2/2002 | Harada |
| 2007/0164188 | A1 | | 7/2007 | Mordau et al. |
| 2008/0094162 | A1 | * | 4/2008 | Schaerrer et al. ......... 336/178 |

FOREIGN PATENT DOCUMENTS

DE 103 33 035 2/2005

* cited by examiner

*Primary Examiner* — Timothy Thompson
*Assistant Examiner* — Hiram E Gonzalez
(74) *Attorney, Agent, or Firm* — Daniel J. Deneufbourg

(57) ABSTRACT

An assembly for retaining a coil wire assembly in the pocket of an electronic assembly such as, for example, a sensor. The retaining assembly comprises a cover which is snap-fitted over the pocket to retain and prevent the movement of the coil assembly in the pocket. In one embodiment, the ends of the coil wire assembly are retained in respective grooves formed in the cover and also in respective grooves formed in respective terminals which extend into the pocket.

6 Claims, 5 Drawing Sheets

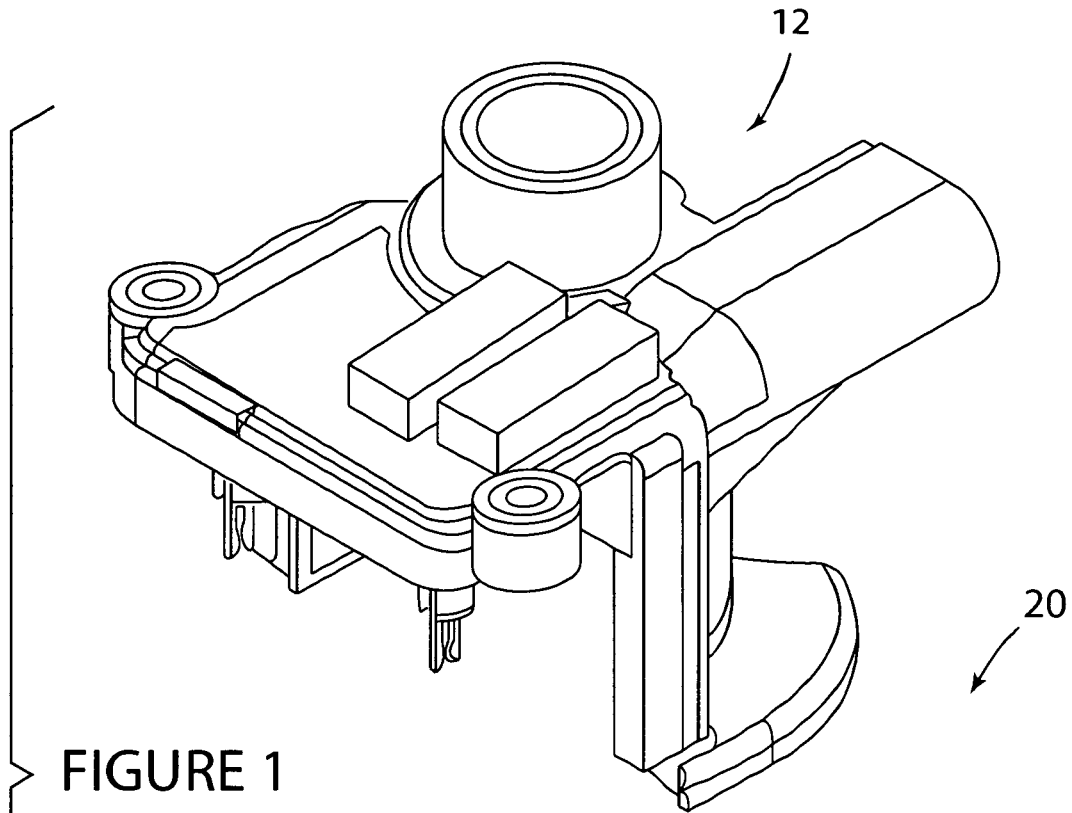
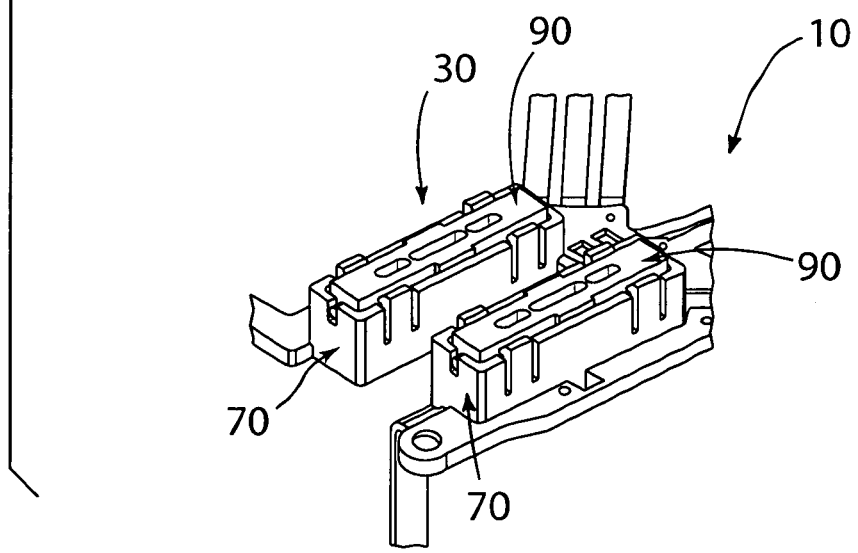
FIGURE 1

//COIL RETENTION ASSEMBLY FOR ELECTRONIC ASSEMBLY

CROSS-REFERENCE TO RELATED APPLICATION

This application claims the benefit of the filing date of U.S. Provisional Application Ser. No. 61/137,296, filed on Jul. 29, 2008, which is explicitly incorporated herein by reference as are all references cited therein.

FIELD OF THE INVENTION

This invention relates to an electronic assembly and, more particularly, to a coil retention assembly for an electronic assembly such as, for example, a sensor assembly.

BACKGROUND OF THE INVENTION

Some electronic assemblies such as, for example, sensors include, among other elements, a sensor premold assembly with pockets for coil assemblies. A sensor overmold assembly is seated and secured over the top of the sensor premold assembly.

SUMMARY OF THE INVENTION

This invention is directed to an assembly and structure for retaining and preventing the movement of a coil assembly in the pocket of an electronic assembly such as, for example, a premold sensor assembly which, in one embodiment, comprises a cover which covers the pocket and prevents the movement of the coil assembly in the pocket.

The cover includes at least one wall which defines a shoulder and the pocket includes at least one flexible clip which engages with the shoulder on the wall of the cover to retain the cover over the pocket.

The cover also includes at least one wall which defines a recess and the coil wire assembly includes a coil wire having at least one end located in the recess in the wall of the cover when the cover is located over the pocket to prevent movement of the coil assembly in the pocket.

The pocket also includes at least one terminal extending therein which defines a recess which receives the end of the coil wire.

In one embodiment, the cover includes opposed longitudinal edges defining first and second spaced apart shoulders and first and second opposed walls each defining a recess; the pocket includes opposed longitudinal walls each including spaced apart flexible clips which engage with the first and second shoulders on the cover; and first and second terminals with respective recesses defined therein extend into the pocket and receive the opposed ends of the coil assembly.

Other advantages and features of the present invention will be more readily apparent from the following detailed description of the preferred embodiment of the invention, the accompanying drawings, and the appended claims.

BRIEF DESCRIPTION OF THE DRAWINGS

These and other features of the invention can best be understood by the following description of the accompanying drawings as follows:

FIG. 1 is an exploded perspective view of a sensor overmold assembly and a sensor premold assembly incorporating a pair of coil pocket covers in accordance with the invention;

DETAILED DESCRIPTION

Figure 2:
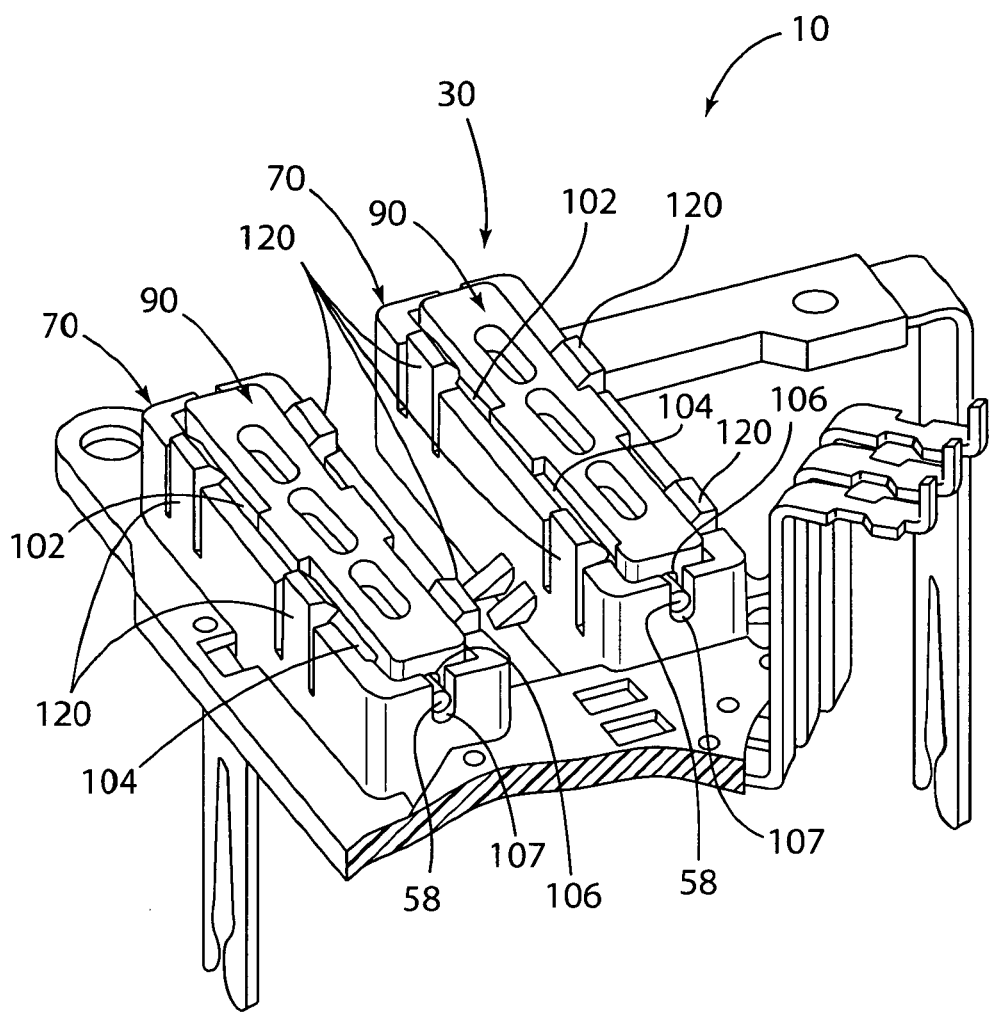
FIG. 2 is an enlarged perspective view of the sensor premold assembly of FIG. 1.

FIG. 1 depicts an electronic assembly in the form of a sensor 20 including a premold sensor coils and terminal assembly 10 incorporating the features of the present invention and a sensor overmold assembly 12 adapted to be seated and secured over the assembly 10 during the assembly process.

The invention is particularly directed to the premold coil and terminal assembly 10 and, more specifically, to a coil retention assembly 30 (FIGS. 1 and 2) associated therewith and adapted to retain and prevent the movement of respective coil assemblies 50 (FIG. 3) within the respective coil retention pockets 70 (FIG. 3) during the overmold process.

Coil retention assembly 30 is generally comprised of: a pair of coil retention covers 90 (FIGS. 1-8); a plurality of flexible prongs or fingers 120 formed in respective pockets 70 (FIGS. 1, 2, 3, and 4) for snap-fitting and locking the respective covers 90 to the respective pockets 70; and an elongated channel 158 (FIGS. 3 and 5) defined in each of the terminals 150a and 150b which extend into each of the respective pockets 70.

Each of the coil retention covers 90 (FIGS. 7 and 8) is generally in the form of an open, generally rectangularly-shaped box which has a top plate or roof 92 including a generally V-shaped interior surface 93, opposed parallel longitudinal side walls 94 and 96 extending generally normally outwardly and downwardly from the respective opposed parallel longitudinal edges of top surface 92 and opposed, parallel, transverse end walls 98 and 100 also extending generally normally outwardly from the respective opposed transverse edges of the top surface 92, all of the walls 94, 96, 98, and 100 together forming the sides of the open box-shaped cover 90.

Each of the longitudinal side walls 94 and 96 defines a pair of spaced-apart, co-linear ledges or platforms or shoulders 102 and 104 formed along the edge of cover 90 where walls 94 and 96 meet the roof 92. Each of the transverse end walls 98 and 100 defines a generally semi-oval-shaped central elongate open groove or recess 106 extending therein in an orientation generally normal to the roof 92. The roof 92 additionally defines three spaced-apart, co-linear, generally oval-shaped through apertures 105 formed therein.

Each of the pockets 70 (FIG. 3) of the sensor premold assembly 10 includes a generally concave bottom surface or floor or base 109 (FIG. 6), a pair of opposed parallel, longitudinally extending side walls 74 and 76 (FIGS. 3, 4, and 6) extending generally normally outwardly from the respective opposed, parallel longitudinal edges of the base 109, and a pair of opposed, parallel transverse end walls 78 and 80 (FIGS. 2 and 4) also extending generally normally outwardly from the respective opposed, parallel longitudinal edges of the base 109; all of the walls 74, 76, 78, and 80 together forming the sides and open interior 111 (FIG. 3) of each of the generally rectangularly-shaped open box-like interior pockets 70.

Figure 3:
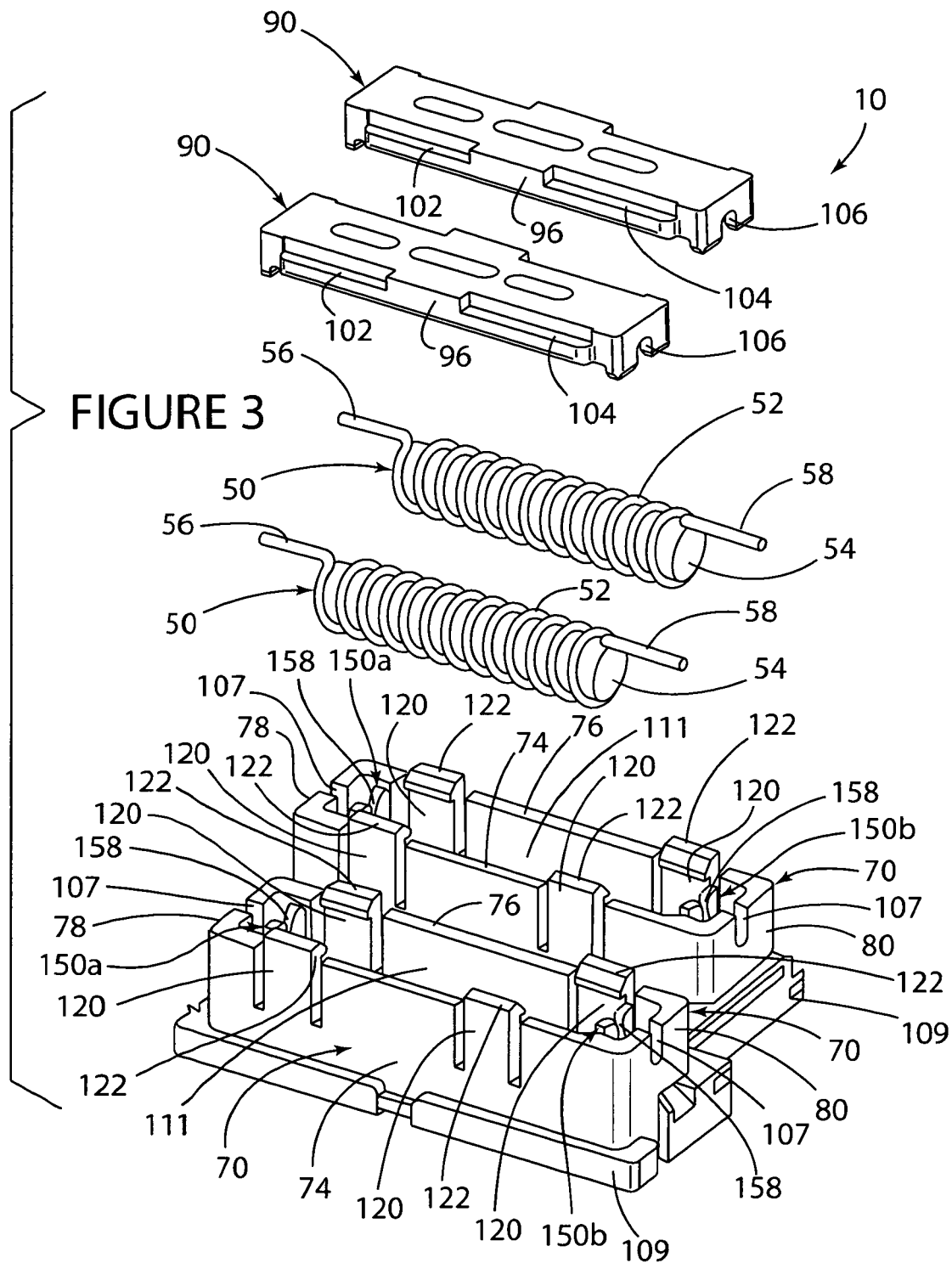
FIG. 3 is an exploded perspective view of the sensor premold assembly of FIG. 2.

Each of the longitudinal side walls 74 and 76 of each of the pockets 70 defines a pair of spaced-apart, parallel flexible prongs or fingers or clips 120 (FIGS. 1, 2, 3, and 4). Each of the clips 120 defines a terminal shouldered clip head 122 (FIG. 3). Each of the transverse end walls 78 and 80 defines a generally semi-oval-shaped central elongate open groove or recess 107 extending therein in an orientation generally normal to the base 109.

Figure 5:
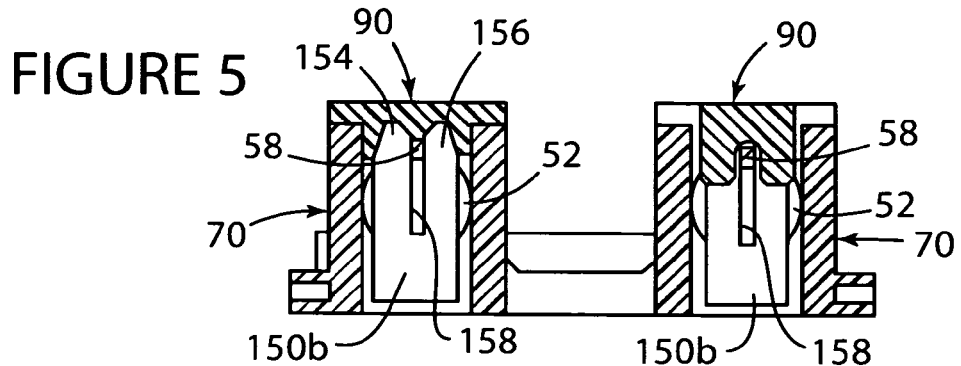
FIG. 5 is an enlarged vertical cross-sectional side view of the sensor premold assembly taken along the line 5-5 in FIG. 4.

As shown in FIGS. 3 and 5, sensor premold assembly 10 additionally comprises a pair of terminals 150a and 150b protruding into the open interior 111 of each of the pockets 70. The distal head of each of the terminals 150a and 150b includes a pair of spaced-apart fingers 154 and 156 (FIG. 5) together defining a central elongate groove or channel 158 therebetween (FIGS. 3 and 5) and extending therein in an orientation generally parallel to the pocket walls 74 and 76. Terminal 150a is positioned adjacent, spaced, and parallel to pocket wall 78 in a relationship wherein the channel 158 of terminal 150a is aligned generally co-planarly and co-linearly with the groove 106 in pocket wall 78. Terminal 150b is positioned adjacent, spaced, and parallel to opposed pocket wall 80 in a relationship wherein channel 158 of terminal 150b is aligned generally co-planarly and co-linearly with the groove 106 in pocket wall 80.

Figure 6:
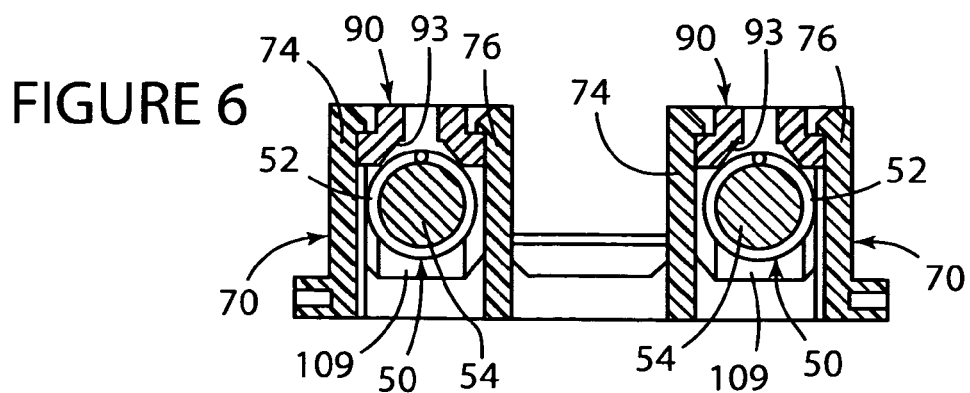
FIG. 6 is an enlarged vertical cross-sectional view of the sensor premold assembly taken along the line 6-6 in FIG. 5.
Figure 7:
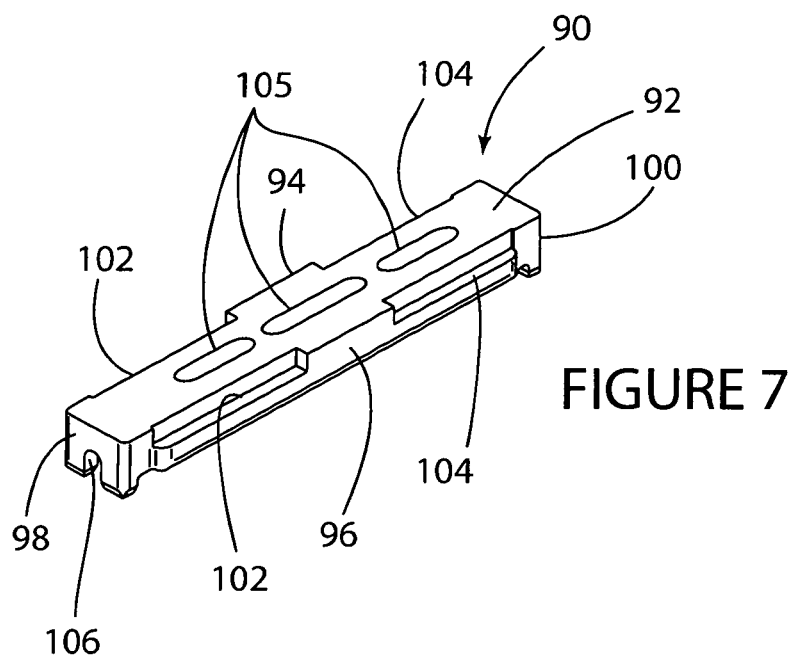
FIG. 7 is an enlarged perspective view of the exterior of one of the sensor premold assembly covers of the present invention.
Figure 8:
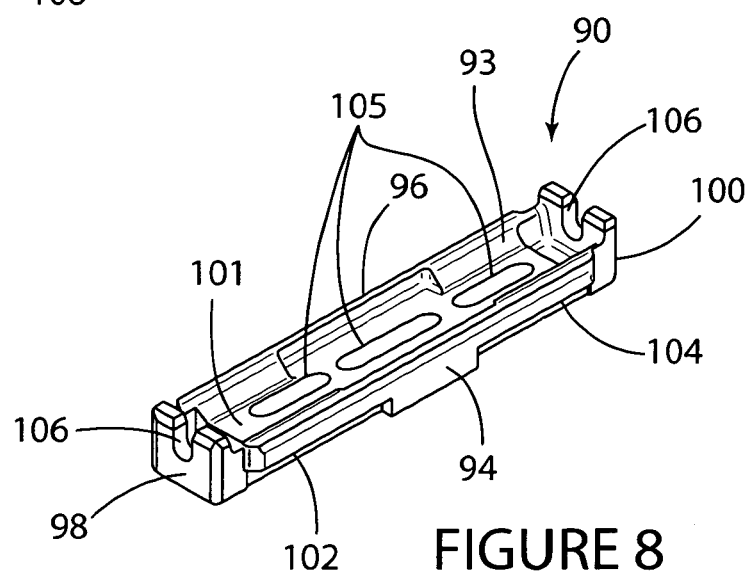
FIG. 8 is an enlarged perspective view of the interior of one of the sensor premold assembly covers of the present invention.

As shown in FIGS. 3 and 6 in particular, sensor premold assembly 10 additionally comprises a pair of generally cylindrically shaped coil assemblies 50, each including an elongate generally cylindrically shaped coil wire 52 wrapped around an elongate generally cylindrically shaped coil wire base or core 54. Coil wire 52 includes a pair of opposed, generally horizontal end fingers 56 and 58. Coil assemblies 50 are seated in respective pockets 70 in a relationship wherein the respective coils 52 thereof are seated against the exterior surface of the concave base 109 of respective pockets 70 and the opposite ends 56 and 58 of respective coil wires 52 extend successively into and through the channel 158 in respective terminals 150a and 150b and the channel 106 in respective pocket walls 78 and 80 as particularly shown in FIGS. 2 and 4.

After the coil assemblies 50 have been seated in respective pockets 70, respective covers 90 are lowered over the respective pockets 70 in a relationship wherein the walls 94, 96, 98, and 100 of the respective covers 90 extend into the interior 111 of the respective pockets 70 and the exterior surface of the cover walls 94, 96, 98, and 100 abuts the respective pocket walls 74, 76, 78, and 80.

Figure 4:
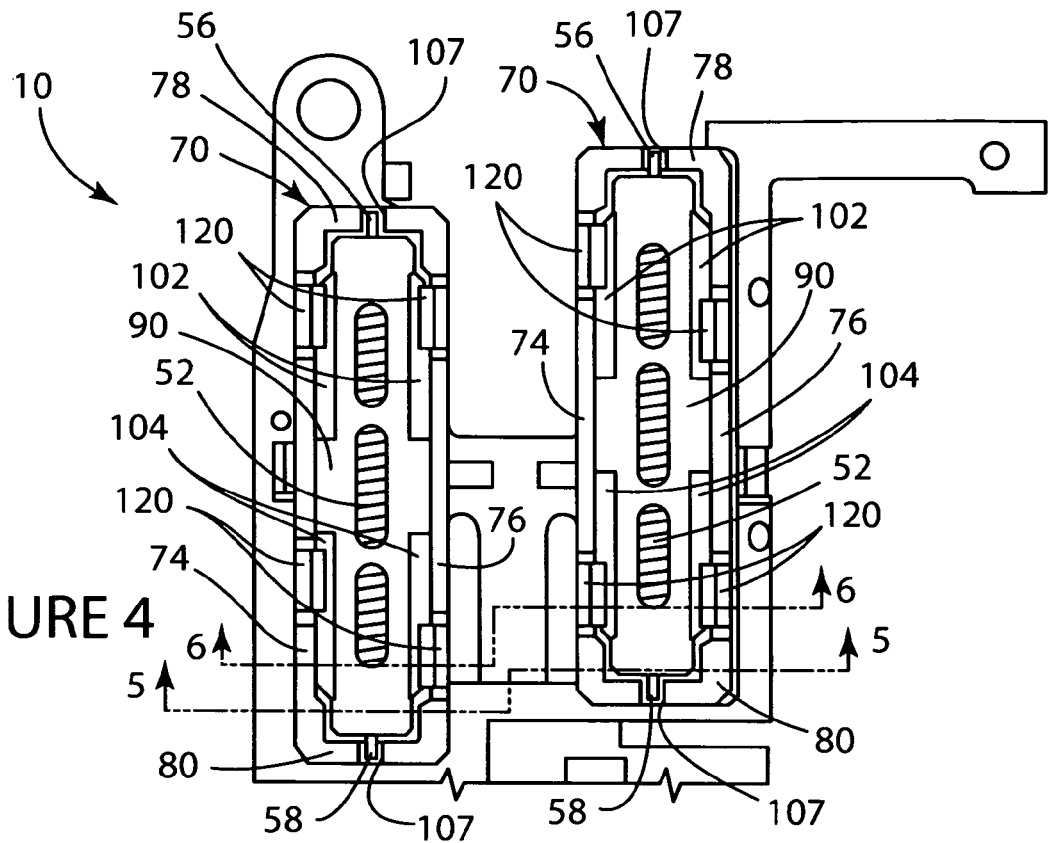
FIG. 4 is a broken top plan view of the sensor premold assembly.

In accordance with the present invention and as shown in FIGS. 2 and 4, it is understood that, when the respective covers 90 are lowered over and into the respective pockets 70, the engagement between the pocket walls 74 and 76 and the respective cover walls 94 and 96 causes the pocket wall clips 120 to flex initially outwardly and then subsequently snap back inwardly into a relationship wherein the heads 122 of respective clips 120 engage with and against the respective cover shoulders 102 and 104, after the respective covers 90 have been lowered sufficiently to cause the clip heads 122 to clear the respective cover shoulders 102 and 104, thereby locking the respective covers 90 over the pockets 70.

Additionally, and as shown in FIGS. 5 and 6, the respective covers 90 are lowered into the respective pockets 70 into a relationship and position wherein the interior concave surface 93 of the roof 92 of respective covers 90 abuts against the top of the coils 52 of respective coil assemblies 50 and the respective transverse cover end walls 98 and 100 are sandwiched between the respective terminals 150a and 150b and the respective pocket end walls 78 and 80. In this position, the ends 56 and 58 of respective coil wires 52 are located in the respective cover end wall recesses 106 and, more specifically, abut against the interior surface of the respective cover end walls 98 and 100 defining the respective recesses 106 therein to retain and keep the respective coil ends 56 and 58 in the respective terminal recesses 158 and thus keep the respective coil assemblies 50 from moving in the respective pockets 70.

While the invention has been taught with specific reference to one embodiment, someone skilled in the art will recognize that changes can be made in form and detail without departing from the spirit and the scope of the invention. The described embodiment is to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A sensor comprising:
   a sensor premold assembly including a pocket, a coil wire seated in the pocket, and a pair of terminals protruding into opposed ends respectively of the pocket of the sensor premold assembly and in contact with the coil wire, each of the pair of terminals including a distal head protruding into the pocket and including a pair of spaced-apart fingers together defining a channel therebetween, the coil wire being seated in the pocket between the pair of terminals and including respective end coil fingers extending into the respective channels in the respective distal heads of the pair of terminals;
   a cover over the pocket of the sensor premold assembly, the cover being abutted against the coil wire seated in the pocket of the sensor premold assembly and retaining the coil wire in the pocket of the sensor premold assembly; and
   a sensor overmold assembly separate from the cover and secured over the sensor premold assembly and the cover.

2. A sensor comprising:
   a sensor premold assembly including a pocket with a pair of opposed end walls, a coil wire seated in the pocket between the pair of end walls of the pocket, and a pair of terminals protruding into the pocket of the sensor premold assembly and in contact with the coil wire, the pair of terminals being located adjacent the pair of end walls respectively;
   a cover mounted over the pocket of the sensor premold assembly, the cover being abutted against the coil wire seated in the pocket of the sensor premold assembly and retaining the coil wire in the pocket of the premold assembly, the cover including a pair of end walls, each of the pair of end walls of the cover extending into the pocket of the sensor premold assembly and defining an elongated recess, the coil wire including a pair of distal end coil fingers located in the recess in the respective end walls of the cover to retain the coil wire in the pocket, the cover being mounted over the pocket in a relationship wherein the pair of end walls of the cover extend between the pair of end walls of the pocket respectively and the pair of terminals respectively.

3. A retention assembly for a coil assembly of a sensor premold assembly, the coil assembly including a coil wire wrapped around a coil base and the sensor premold assembly comprising at least one pocket for the coil assembly and a pair of terminals each including a distal head protruding into the pocket of the sensor premold assembly and defining a channel and the coil assembly being seated in the pocket between the pair of terminals and the coil wire including opposed distal coil wire ends extending into the channel in the distal head of the pair of terminals respectively, the retention assembly comprising a cover over the pocket and including a pair of end walls extending into the pocket of the sensor premold assembly and abutted against the opposed ends respectively of the coil wire for retaining the opposed coil wire ends in the channel of the distal head of the pair of terminals respectively.

4. The retention assembly of claim 3, wherein the pocket is defined by a plurality of walls wherein two of the plurality of walls each include at least one flexible clip, the cover defining opposed edges each including at least one shoulder, the flexible clip engaging with the shoulder to secure the cover to the pocket.

5. The retention assembly of claim 4, wherein the two of the plurality of walls defining the pocket are longitudinal walls each including first and second spaced-apart flexible clips and the cover defines opposed longitudinal edges defining first and second spaced-apart shoulders, the first and second clips engaging the first and second grooves respectively.

6. The retention assembly of claim 3, wherein each of the end walls of the cover defines a groove which receives the respective first and second ends of the coil assembly.

\* \* \* \* \*